(12) United States Patent
Miura et al.

(10) Patent No.: US 9,333,851 B2
(45) Date of Patent: May 10, 2016

(54) FUEL CUTOFF VALVE (71) Applicant: TOYODA GOSEI CO., LTD., Kiyosu-shi, Aichi-ken (JP)

(72) Inventors: Natsushi Miura, Kiyosu (JP); Kenichiro Kaneko, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 196 days.

(21) Appl. No.: 14/061,919

(22) Filed: Oct. 24, 2013

(65) Prior Publication Data
US 2014/0116537 A1 May 1, 2014

(30) Foreign Application Priority Data

Oct. 31, 2012 (JP) ................................. 2012-239854

(51) Int. Cl.
*B60K 15/035* (2006.01)
*B60K 15/03* (2006.01)

(52) U.S. Cl.
CPC . *B60K 15/03519* (2013.01); *B60K 2015/03289* (2013.01); *Y02T 10/32* (2013.01); *Y10T 137/7287* (2015.04)

(58) Field of Classification Search
CPC . F02D 19/025; F02D 19/02; B60K 15/03519; B60K 15/035; B60K 2015/03289; Y02T 10/32; Y10T 137/7287
USPC ............................................ 137/386, 202, 43
See application file for complete search history.

(56) References Cited

U.S. PATENT DOCUMENTS

| | | | | |
|---|---|---|---|---|
| 4,905,726 A * | 3/1990 | Kasugai et al. | ............... | 137/433 |
| 5,535,772 A * | 7/1996 | Roetker et al. | ................... | 137/43 |
| 5,577,526 A * | 11/1996 | Kasugai et al. | ............... | 137/202 |
| 6,286,539 B1 * | 9/2001 | Nishi et al. | ..................... | 137/202 |
| 6,755,206 B2 * | 6/2004 | Nishi et al. | ..................... | 137/202 |
| 6,827,098 B2 * | 12/2004 | Sugiyama et al. | ............. | 137/202 |
| 6,959,720 B2 * | 11/2005 | Kurihara et al. | .............. | 137/202 |
| 6,981,514 B2 | 1/2006 | Nishi | | |
| 7,013,908 B2 | 3/2006 | Miyoshi et al. | | |
| 7,063,101 B2 * | 6/2006 | Williamson et al. | .......... | 137/202 |
| 7,168,441 B2 * | 1/2007 | Miyoshi et al. | ............... | 137/202 |
| 7,188,613 B2 * | 3/2007 | Miura et al. | .................. | 123/516 |
| 7,207,347 B2 * | 4/2007 | Olshanetsky et al. | ......... | 137/202 |

(Continued)

FOREIGN PATENT DOCUMENTS

JP 2004-324570 A 11/2004
JP 2011-178379 A 9/2011

*Primary Examiner* — Craig Schneider
*Assistant Examiner* — Josephine Trinidad-Borges
(74) *Attorney, Agent, or Firm* — Posz Law Group, PLC (57) ABSTRACT

A fuel cutoff valve comprises a casing having a primary valve chamber and a secondary valve chamber, a primary valve mechanism housed in the primary valve chamber, and a secondary valve mechanism housed in the secondary valve chamber. The casing has a first communication path that connects the inside of the fuel tank and the primary valve chamber, and a second communication path that connects the primary valve chamber and the secondary valve chamber, due to the differential pressure between the tank internal pressure and the primary valve chamber, by the fuel in the fuel tank flowing into the primary valve chamber through the first communication path, a connection conduit is closed by the primary valve mechanism. When the fuel level inside the fuel tank reaches a second fuel level, the second communication path is closed by the rising of the secondary valve mechanism.

15 Claims, 7 Drawing Sheets

(56) References Cited

U.S. PATENT DOCUMENTS

| | | | |
|---|---|---|---|
| 7,418,976 B2* | 9/2008 | Henley et al. | 137/505 |
| 7,527,064 B2* | 5/2009 | Kito et al. | 137/39 |
| 7,886,759 B2* | 2/2011 | Miyoshi et al. | 137/202 |
| 7,963,296 B2* | 6/2011 | Kaneko | 137/202 |
| 8,042,564 B2* | 10/2011 | Ando et al. | 137/202 |
| 8,220,481 B2* | 7/2012 | Miura | 137/202 |
| 8,720,471 B2* | 5/2014 | Yasuda et al. | 137/202 |
| 8,967,181 B2* | 3/2015 | Wetzel et al. | 137/202 |
| 2001/0054438 A1* | 12/2001 | Shimamura et al. | 137/202 |
| 2002/0144730 A1* | 10/2002 | Brock et al. | 137/202 |
| 2006/0213555 A1* | 9/2006 | Miura et al. | 137/202 |
| 2009/0000668 A1* | 1/2009 | Roscher et al. | 137/202 |
| 2009/0194170 A1* | 8/2009 | Martin et al. | 137/197 |
| 2009/0211649 A1 | 8/2009 | Miura et al. | |
| 2010/0224265 A1* | 9/2010 | Kobayashi et al. | 137/202 |
| 2011/0186149 A1 | 8/2011 | Tagami et al. | |

* cited by examiner

FUEL CUTOFF VALVE

This application claims the benefit of and priority from Japanese Application No. 2012-239854 filed Oct. 31, 2012, the content of which is incorporated herein by reference.

BACKGROUND OF THE INVENTION

1. Field of the Invention

The present invention relates to a fuel cutoff valve for opening and closing a connection conduit that connects a fuel tank and the outside.

2. Description of the Related Art

A fuel cutoff valve is disclosed in JP-A 2004-324570. The fuel cutoff valve functions as a full tank detection valve that detects that the fuel is filled in the fuel tank when fueling by a fuel gun. The full tank detection valve is equipped with a casing that forms a valve chamber, and a float. In the full tank detection valve, when an introduction opening of the bottom of the casing is blocked by the fuel, the internal pressure of the fuel tank increases, the fuel is introduced into the valve chamber due to the differential pressure between the internal pressure of the tank and the pressure of the valve chamber, and the float rises to close a connection conduit connecting the valve chamber and the outside. By closing of the connection conduit, the internal pressure of the tank increases, and the fuel level inside an inlet pipe rises. When the sensor of the fuel gun detects the fuel rising inside the inlet pipe, and automatically stops fueling of the fuel gun. Also, the fuel cutoff valve also functions as a rollover valve. The rollover valve ensures ventilation between the fuel tank interior and the outside through a ventilation hole provided on the top part of the casing, and prevents the fuel in the fuel tank from flowing out of the fuel tank to the outside by the rising float closing the connection conduit when the fuel tank is tilted due to tilting of a vehicle.

SUMMARY

However, with the fuel cutoff valve, after the float closing the connection conduit to stop the fueling, vapor enters the valve chamber through the ventilation hole, the fuel liquid level of the valve chamber drops, and the float falls to open the connection conduit. In the state, the user can additionally fill fuel. With additional fueling, overfilling occurs a blowing back flow from the injection port of the inlet pipe.

(1) According to an aspect of the invention, there is a fuel cutoff valve that opens and closes a connection conduit connecting a fuel tank and the outside. The fuel cutoff valve comprises: a casing that includes a primary valve chamber connected to the connection conduit, and a secondary valve chamber disposed under the primary valve chamber; a primary valve mechanism that is housed in the primary valve chamber and rises and falls according to a fuel level in the primary valve chamber; and a secondary valve mechanism that is housed in the secondary valve chamber and rises and falls according to a fuel level in the secondary valve chamber. The casing includes a first communication path connecting the fuel tank and the primary valve chamber, and a second communication path connecting the primary valve chamber and the secondary valve chamber. The casing and the primary valve mechanism are configured such that the primary valve mechanism closes the connecting conduit by the fuel in the fuel tank entering the primary valve chamber through the first communication path due to a differential pressure between an internal pressure of the tank and a pressure of the primary valve chamber when the fuel level in the fuel tank reaches a first fuel level. The casing and the secondary valve mechanism are configured such that the secondary valve mechanism closes the second communication path when the fuel level in the fuel tank reaches a second fuel level as same as the first fuel level or higher than the first fuel level. When using the fuel cutoff valve of this mode for the fuel tank, when the fuel level inside the fuel tank reaches a first fuel level due to fueling to the fuel tank, fuel is input to a primary valve chamber through a primary communication path, a primary valve mechanism rises, and a connection conduit is cutoff. Then, when the fuel level inside the fuel tank exceeds a second fuel level, a secondary valve mechanism rises by an increase in its buoyancy, and by a second communication path being cutoff, flowing out of the fuel inside the primary valve chamber is inhibited, and the closed valve state of the primary valve mechanism is maintained. By doing this, it is possible to reliably prevent overfilling by maintaining a state with the internal pressure of the fuel tank increased.

(2) With the constitution of another mode, the fuel inside the primary valve chamber is gradually exhausted, and it is possible to delay the valve opening operation of the primary valve mechanism, and possible to prevent overfilling.

(3) With the configuration of another mode, after additional fueling, it is possible to reliably close the primary valve mechanism, and possible to prevent overfilling.

(4) With another mode, the casing is equipped with a cylindrical shaped outer casing, and an inner casing which has a cylindrical shape with a smaller diameter than the outer casing and is disposed inside the outer casing, wherein the first communication path is configured with a gap formed between the outer casing and the inner casing.

With another mode, the inner casing includes a cylinder shaped side wall with a guide hole, and the secondary valve mechanism includes a secondary float with a cylinder shaped side wall, wherein the cylinder shaped side wall has a guide projection that penetrates the guide hole and guides the rise and fall in the vertical direction of the secondary float.

With another mode, the inner casing includes a cylinder shaped side wall with a positioning part projections, wherein the positioning part projections is configured to project from the top edge of the side wall, so as to contact to an inner wall of the outer casing, positioning the inner casing to the outer casing in an axis direction of the outer casing.

With another mode, the outer casing includes a cylinder shaped side wall with a connection hole, and the inner casing includes a cylinder shaped side wall with a positioning part, wherein the positioning part has a cantilever elastic piece and an engaging protrusion provided projecting from the elastic piece, the engaging protrusion being configured to engage with the connection holes, thereby the inner casing being attached to the outer casing.

These and other objects, features, aspects, and advantages of the present invention will become more apparent from the following detailed description of the preferred embodiments with the accompanying drawings.

DESCRIPTION OF THE PREFERRED EMBODIMENTS

(1) Schematic Structure of the Fuel Cutoff Valve

Figure 1:
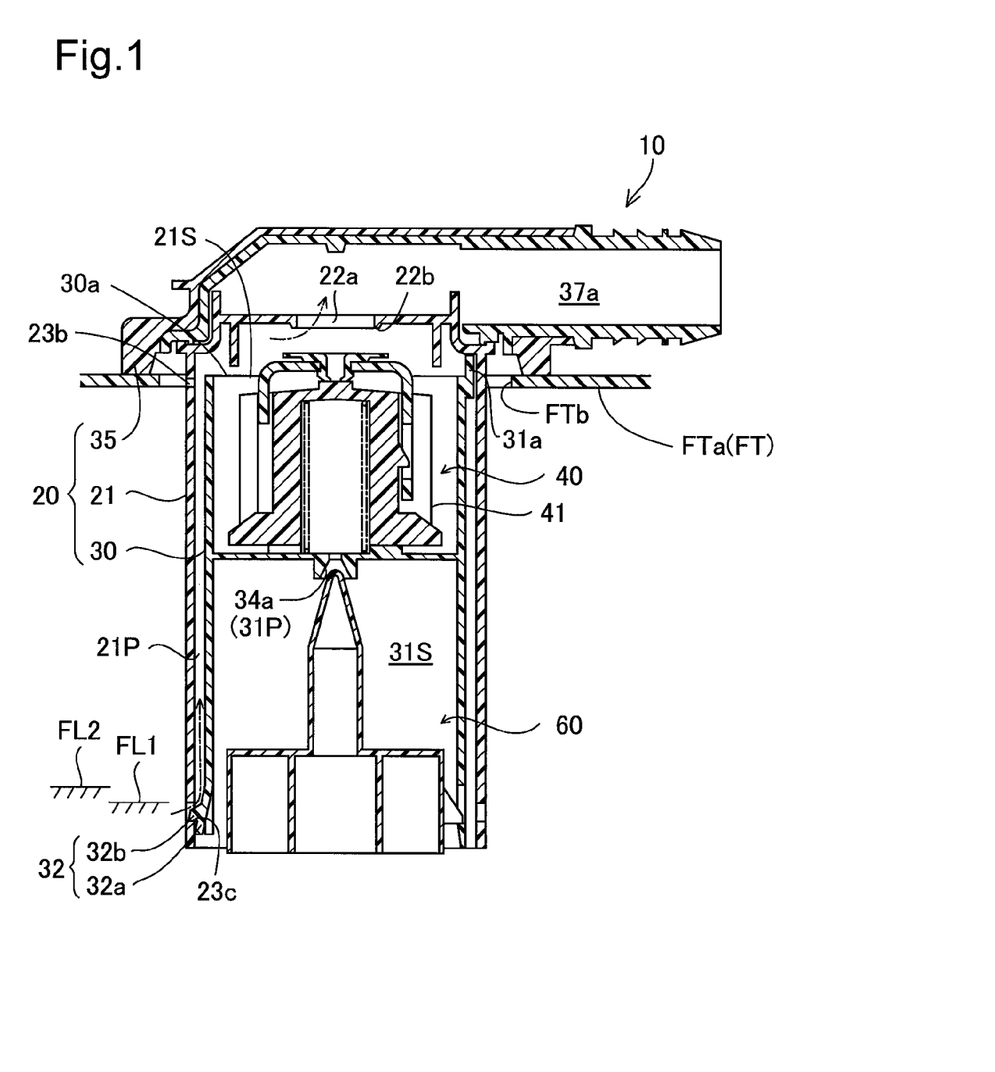
FIG. 1 is a cross section view showing the fuel cutoff valve attached to the top part of the fuel tank of an automobile of an embodiment of the present invention.

FIG. 1 is a cross section view showing a fuel cutoff valve 10 attached to the top part of a tank FT of an automobile of an embodiment of the present invention. In FIG. 1, the fuel tank FT has its surface formed from a composite resin material including polyethylene. An attachment hole FTb is formed on a tank upper wall FTa. On the tank upper wall FTa, the fuel cutoff valve 10 is attached in a state with its bottom part penetrating the attachment hole FTb. The fuel cutoff valve 10 shuts off the outflow of fuel to a canister when the fuel inside the fuel tank FT has reached the full tank fuel level during fueling, and also allows additional fueling of a predetermined volume. Furthermore, the fuel cutoff valve 10 functions as a rollover valve for preventing fuel inside the fuel tank FT from flowing out to the outside such as when the vehicle has tilted other than during fueling. Specifically, the fuel cutoff valve 10 is a so-called module valve equipped with two functions as a full tank detection valve and a rollover valve. Following, we give a detailed description of the constitution of the fuel cutoff valve 10.

(2) Constitution of Each Part of the Fuel Cutoff Valve 10

Figure 2:
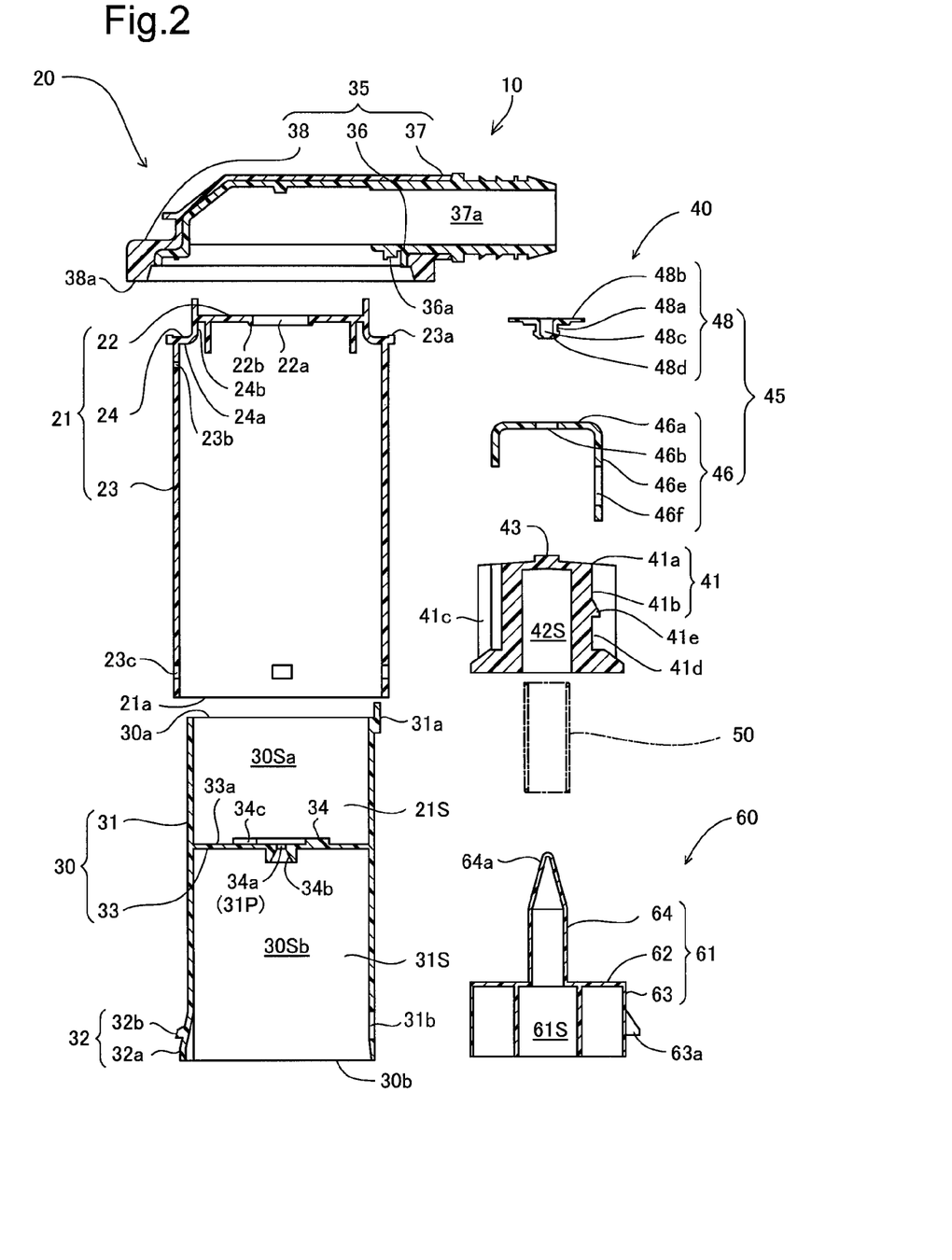
FIG. 2 is a cross section view of the fuel cutoff valve shown in exploded form.
Figure 3:
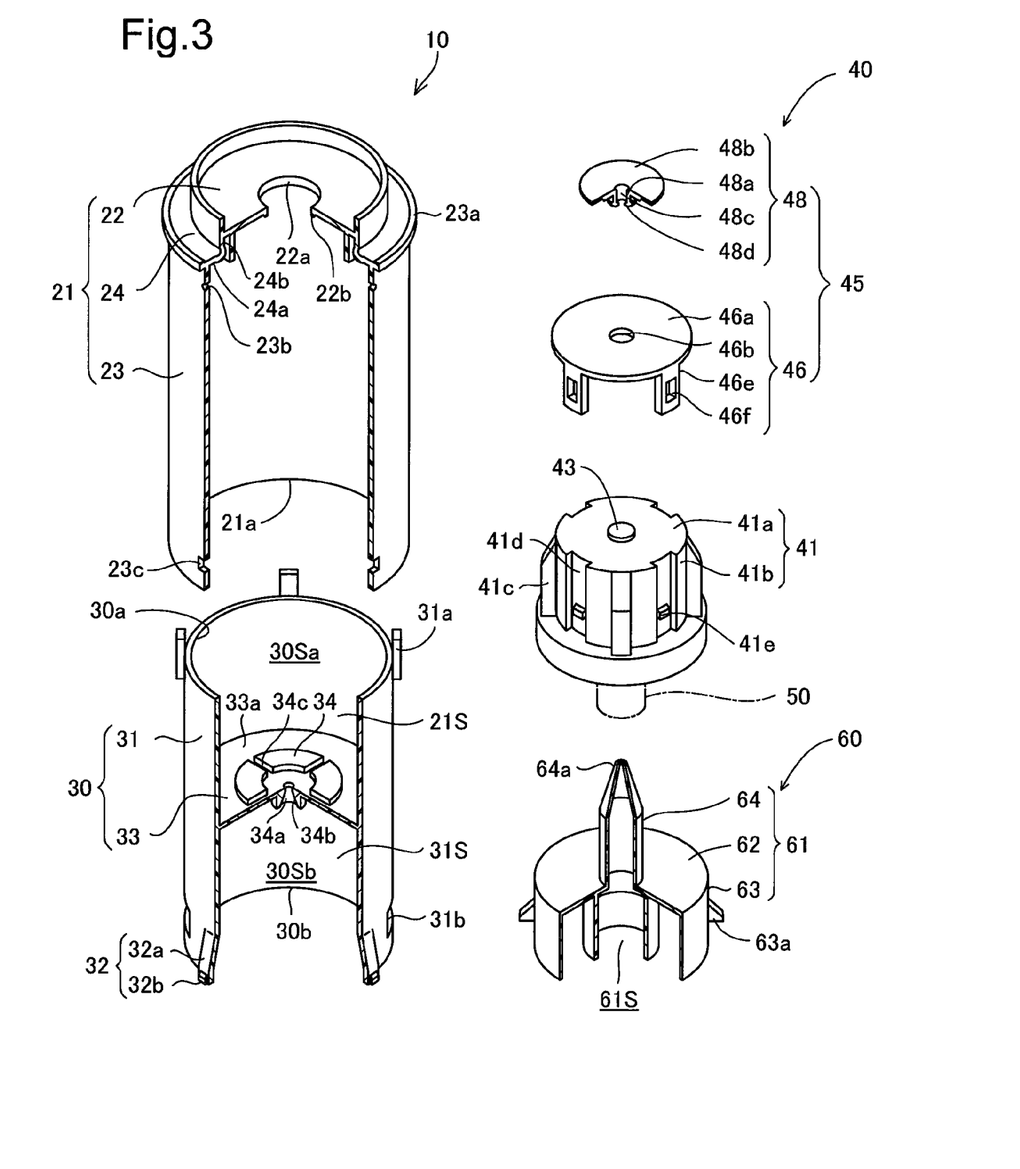
FIG. 3 is a perspective view showing a partial cutaway of the casing in exploded form.

The fuel cutoff valve 10 is equipped with a casing 20, a primary valve mechanism 40, and a secondary valve mechanism 60 as the major constitution, and is constituted so that the primary valve mechanism 40 and the secondary valve mechanism 60 can rise and fall in the axial direction (vertical direction) of the casing 20. The casing 20 is equipped with an outer casing 21, an inner casing 30 disposed on the inside of the outer casing 21, and a cover 35. FIG. 2 is a cross section view showing an exploded view of the fuel cutoff valve 10, and FIG. 3 is a perspective view shown with a partial cutaway of an exploded view of the casing 20. The outer casing 21 has a disk shaped upper wall 22, a round cylinder shaped side wall 23, and a connecting part 24 that connects the outer circumference part of the upper wall 22 and the top part of the side wall 23, and is a cup shape that is enclosed by these. The lower part of the outer casing 21 is an opening 21a. A connection conduit 22a is formed through the upper wall 22, and the opening circumference edge part of the connection conduit 22a is a main seal part 22b. A flange 23a is formed projecting in the outer circumference direction on the top part of the side wall 23. The flange 23a is a part welded with the cover 35. Vents 23b are formed on the top part of the side wall 23. Connection holes 23c are formed on the bottom part of the side wall 23. The connection holes 23c connect the inside of the outer casing 21 and the inside of the fuel tank FT, and engage with the inner casing 30. The connecting part 24 is formed in a cross section L shape, in other words, and is equipped with a circular plate 24a formed integrally with the top edge of the side wall 23 and projecting to the inner circumference side, and a cylindrical portion 24b erected from the inner circumference side of the circular plate 24a, and is formed in stages padding out and connecting the upper wall 22 from the top edge of the side wall 23.

The inner casing 30 is equipped with a round cylinder shaped side wall 31, and a bottom wall 33 which divides the space inside the side wall 31 into an upper chamber 30Sa and a lower chamber 30Sb. The upper chamber 30Sa is opened upward through an upper opening 30a. The lower chamber 30Sb is opened downward through a lower opening 30b. The upper chamber 30Sa forms a primary valve chamber 21S by being enclosed by the inner casing 30 and the outer casing 21. The lower chamber 30Sb forms a secondary valve chamber 31S by being enclosed by the lower part of the inner casing 30. The top part of the side wall 31 is provided extending in the axis direction (perpendicular direction) up to the position facing the vents 23b. Since the top portion of the side wall 31 is formed up to the position facing the vents 23b, the air flow entering the primary valve chamber 21S through the vents 23b is weakened, preventing tilting of the primary valve mechanism 40. Positioning part projections 31a are formed on the top part of the side wall 31. The positioning part projections 31a are rod shaped members projecting from the top edge of the side wall 31, and contacts from the axis direction (downward in the vertical direction) on the inner wall of the circular plate 24a of the connecting part 24 of the outer casing 21, positioning the inner casing 30 in the axis direction of the outer casing 21. The side wall 31 of the inner casing 30 forms a predetermined gap between the inner casing 30 and the outer casing 21 when covered by the side wall 23 of the outer casing 21. The above gap, the gap between the inner wall of the connecting part 24, the positioning part projections 31a and the upper opening 30a of the inner casing 30 constitute a first communication path 21P (FIG. 1). On the bottom part of the side wall 31, at an interval of 90° in the circumference direction, four guide holes 31b and positioning parts 32 are formed alternately. Each of the guide hole 31b is a hole for which the secondary valve mechanism 60 is supported to be able to slide as described later. Each of the positioning part 32 is equipped with a cantilever elastic piece 32a by the bottom edge of the side wall 31 cutting out, and an engaging protrusion 32b provided projecting at the outer surface of the elastic piece 32a. By the engaging protrusion 32b engaging with the connection holes 23c of the outer casing 21, the inner casing 30 is mounted in the outer casing 21 (see FIG. 1).

The bottom wall 33 is equipped with a round disk shaped bottom main plate 33a. A seat 34 is formed at the center part of the bottom main plate 33a. A secondary connection conduit 34a is formed piercing through the center of the seat 34. A lower seal part 34b is provided projecting so as to enclose the outer circumference lower surface of the secondary connection conduit 34a. Also, grooves 34c connected to the secondary connection conduit 34a are formed radially with the secondary connection conduit 34a in the center of the seat 34. The secondary connection conduit 34a constitutes a portion of the second communication path 31P.

In FIG. 2, the cover 35 is equipped with a cover main body 36, a tubular member 37 projecting to the outside direction from the center of the cover main body 36, and a flange 38 formed on the outer circumference of the cover main body 36, and these are formed as an integral unit. A tube passage 37a is formed in the tubular member 37. One end of the tube passage 37a is connected to the primary valve chamber 21S of the casing 20 through the connection conduit 22a. The other end of the tube passage 37a is connected to a canister (not shown). On the bottom part of the cover main body 36, an inner welding end 36a that welds the flange 23a of the outer casing 21 is formed. On the bottom edge of the flange 38, an outer annual weld portion 38a is formed welded to the tank upper wall FTa (FIG. 1) of the fuel tank FT.

In FIG. 2 and FIG. 3, the primary valve mechanism 40 is housed inside the primary valve chamber 21S, and is equipped with a primary float 41, an upper valve mechanism 45, and a spring 50. The primary float 41 has a cup shape having a buoyancy chamber 42S (FIG. 2) opened downward, and is equipped with an upper wall 41a, and a side wall 41b provided projecting in a round cylinder shape from the outer circumference part of the upper wall 41a. On the side wall 41b, four guide ribs 41c are formed along the vertical direction and at an interval in the circumference direction. The guide ribs 41c guide so as to prevent tilting when the primary float 41 rises and falls by sliding on the inner wall of the side wall 31 of the inner casing 30 shown in FIG. 2. The primary float 41 is supported by the spring 50 (FIG. 2) disposed between the bottom surface of the upper wall 41a and the bottom wall 33 of the inner casing 30.

The upper valve mechanism 45 is a valve for improving the valve reopening characteristics, and is supported to be able to rise and fall on the top part of the primary float 41. The upper valve mechanism 45 is equipped with a valve support member 46 and a rubber valve body 48 mounted on the valve support member 46. The valve support member 46 is equipped with a round plate shaped support upper plate 46a A valve support hole 46b is formed piercing through the center part of the support upper plate 46a. On the outer circumference part of the support upper plate 46a, four support arms 46e that slide inside the guide grooves 41d of the primary float 41 are provide projecting downward at an interval of 90° (only one is shown in FIG. 1). A guide hole 46f is formed on the support arm 46e. By a catch 41e of the primary float 41 penetrating into the guide hole 46f, the upper valve mechanism 45 is supported to be able to rise and fall by a predetermined distance in relation to the primary float 41. The rubber valve body 48 is supported in the valve support member 46 by a support base 48a of the rubber valve body 48 being press fit into the valve support hole 46b. The rubber valve body 48 is equipped with a first seat part 48b formed on the outer circumference part of the support base 48a. The first seat part 48b opens and closes the connection conduit 22a by attaching and detaching with the main seal part 22b (FIG. 2). A connection hole 48c is formed piercing through the support base 48a. A second seat part 48d is formed on the lower opening circumference edge of the connection hole 48c. The second seat part 48d attaches and detaches to the seal part 43 of the center top part of the primary float 41.

The secondary valve mechanism 60 is housed inside the lower chamber 30Sb, and is equipped with a secondary float 61. The secondary float 61 is a cup shape and has a buoyancy chamber 61S opened downward, and is formed with an upper wall 62, a side wall 63 provided projecting in a round cylinder shape from the outer circumference part of the upper wall 62, and a seal projection 64 provided projecting upward from the center part of the upper wall 62. The seal projection 64 is equipped with a seat portion 64a on its top part. The seat portion 64a opens and closes the secondary connection conduit 34a (second communication path 31P) by being seated on and detached from the lower seal part 34b. Guide projections 63a are formed on the side wall 63. The guide projections 63a penetrate the inside of the guide holes 31b and guide the rise and fall in the vertical direction of the secondary float 61.

(3) Operation of the Fuel Cutoff Valve

The operation of the fuel cutoff valve 10 will be explained next.

(3)-1 In FIG. 1, when fuel is supplied to inside the fuel tank FT by fueling, the fuel vapors, which is pooled in the top part of inside the fuel tank FT as the fuel level inside the fuel tank FT rises, is allowed to escape to the canister via a pipeline (not shown) from the fuel cutoff valve 10. Specifically, during the time that the fuel level inside the fuel tank FT does not reached the first fuel level FL1, the primary valve mechanism 40 has the valve open state, so the fuel vapors primarily pass through the first communication path 21P which has a large passage surface area, secondarily pass through the secondary connection conduit 34a of the second communication path 31P, and further are allowed to escape to the canister via the primary valve chamber 21S, the connection conduit 22a, and the tube passage 37a.

Figure 4:
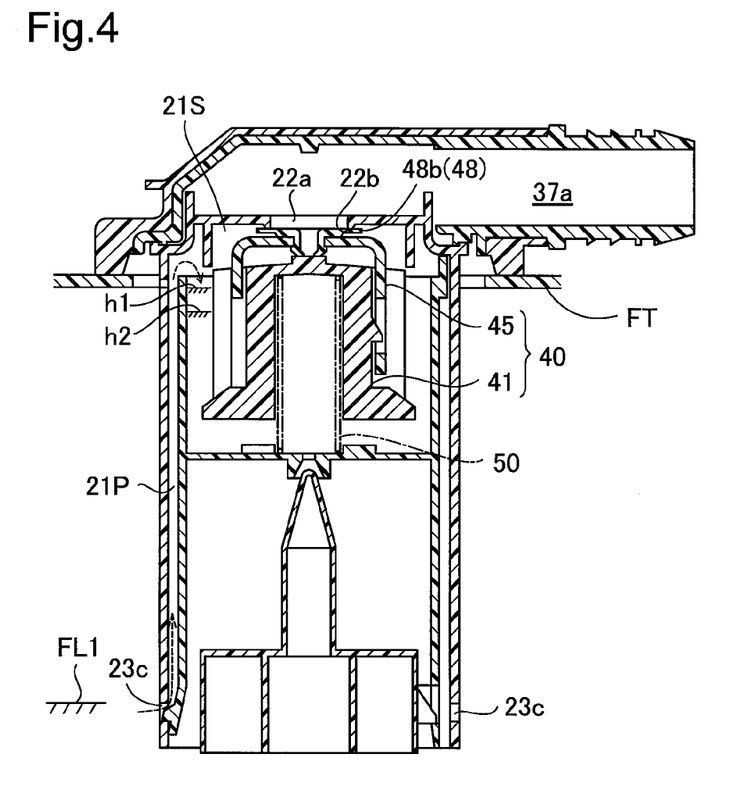
FIG. 4 shows the fueling operation of the fuel cutoff valve.

As shown in FIG. 4, when the fuel level inside the fuel tank FT rises and reaches the first fuel level FL1, and the fuel blocks the connection holes 23c, the tank internal pressure inside the fuel tank FT rises. In the state, the differential pressure between the tank internal pressure (internal pressure of the fuel tank) and the pressure inside the primary valve chamber 21S becomes large, and by a siphon effect, the fuel flows into the primary valve chamber 21S through the first communication path 21P. Then, when the fuel level inside the primary valve chamber 21S reaches the predetermined fuel level h1, by the balance of the force upward by the buoyancy of the primary float 41 and the weight of the spring 50, and the force downward by the tare weight of the primary valve mechanism 40 consisting of the primary float 41 and the upper valve mechanism 45, the primary valve mechanism 40 rises after the former force exceeds the latter force, and the first seat part 48b of the rubber valve body 48 is seated on the main seal part 22b and closes the connection conduit 22a. As a result, the tank internal pressure rises further, the fuel level inside the inlet pipe (not shown) rises, and when the fuel contacts the sensor (not shown) inside the nozzle of the fuel gun, the auto stop which stops the fueling of the fuel gun operates.

Figure 5:
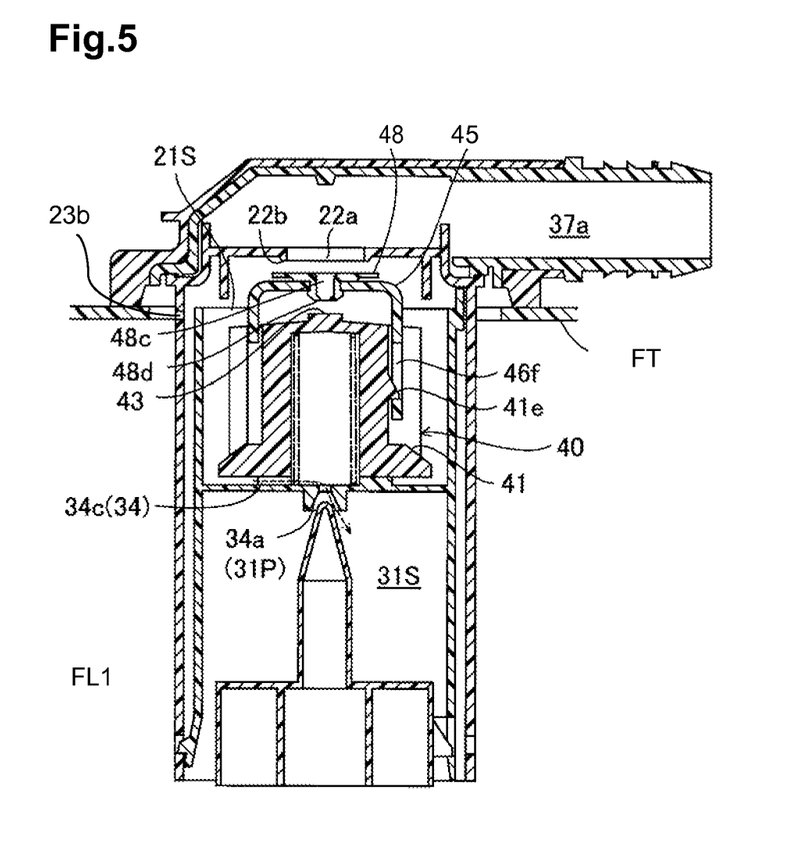
FIG. 5 shows the operation subsequent to FIG. 4.

Then, as shown in FIG. 5, while the fuel tank interior is ventilated by the vents 23b, the fuel inside the primary valve chamber 21S passes through the secondary connection conduit 34a of the second communication path 31P, and the secondary valve chamber 31S, and is gradually exhausted to the fuel tank FT. When the fuel level of the primary valve chamber 21S drops and reaches the predetermined fuel level h2, by decreasing the buoyancy of the primary float 41, the primary float 41 falls, the second seat part 48d of the upper valve mechanism 45 detaches from the seal part 43 of the primary float 41 and opens the connection hole 48c. By communication of the connection hole 48c, by the downward pressure of the upper valve mechanism 45 becoming almost the same pressure as near the connection conduit 22a, the force pulling up the upper valve mechanism 45 becomes smaller, and by the guide hole 46f engaging with the catch 41e, the primary float 41 pulls down the upper valve mechanism 45, and the rubber valve body 48 separates from the main seal part 22b, and the connection conduit 22a is opened. Since the path surface area of the connection hole 48c becomes smaller than the path surface area of the connection conduit 22a, the upper valve mechanism 45 can open with a small force. The two valve structure of the primary valve mechanism 40 functions so as to promote an improvement in valve reopening characteristics. Then, when the connection conduit 22a is opened by the falling of the primary valve mechanism 40, the state is such that additional fueling is possible.

Figure 6:
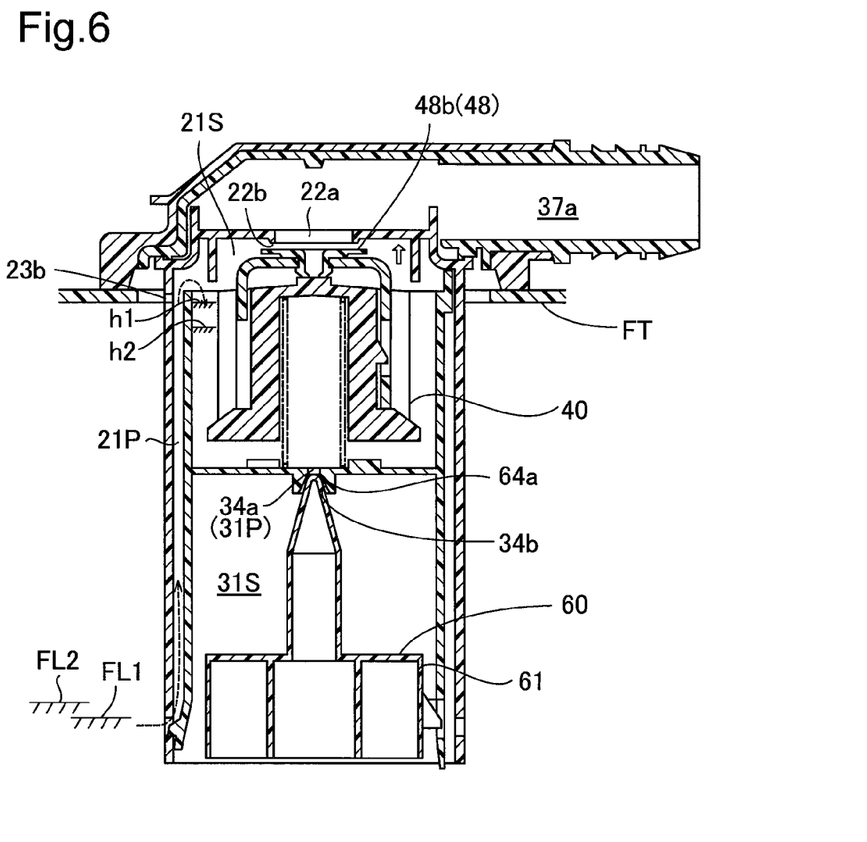
FIG. 6 shows the operation subsequent to FIG. 5.

Furthermore, as shown in FIG. 6, by additional fueling, fuel flows into the secondary valve chamber 31S, and when that fuel level reaches the second fuel level FL2, the secondary float 61 of the secondary valve mechanism 60 rises quickly when its buoyancy exceeds its tare weight, and the seat portion 64a is seated on the lower seal part 34b and blocks the secondary connection conduit 34a. Then, the tank internal pressure inside the fuel tank FT rises again, the differential pressure between the tank internal pressure and the pressure inside the primary valve chamber 21S becomes larger, and the liquid fuel passes through the first communication path 21P and flows into the primary valve chamber 21S. The primary valve mechanism 40 rises, the first seat part 48b of the rubber valve body 48 is seated on the main seal part 22b and closes the connection conduit 22a, and the auto stop mechanism operates again, making it impossible to overfill.

Figure 7:
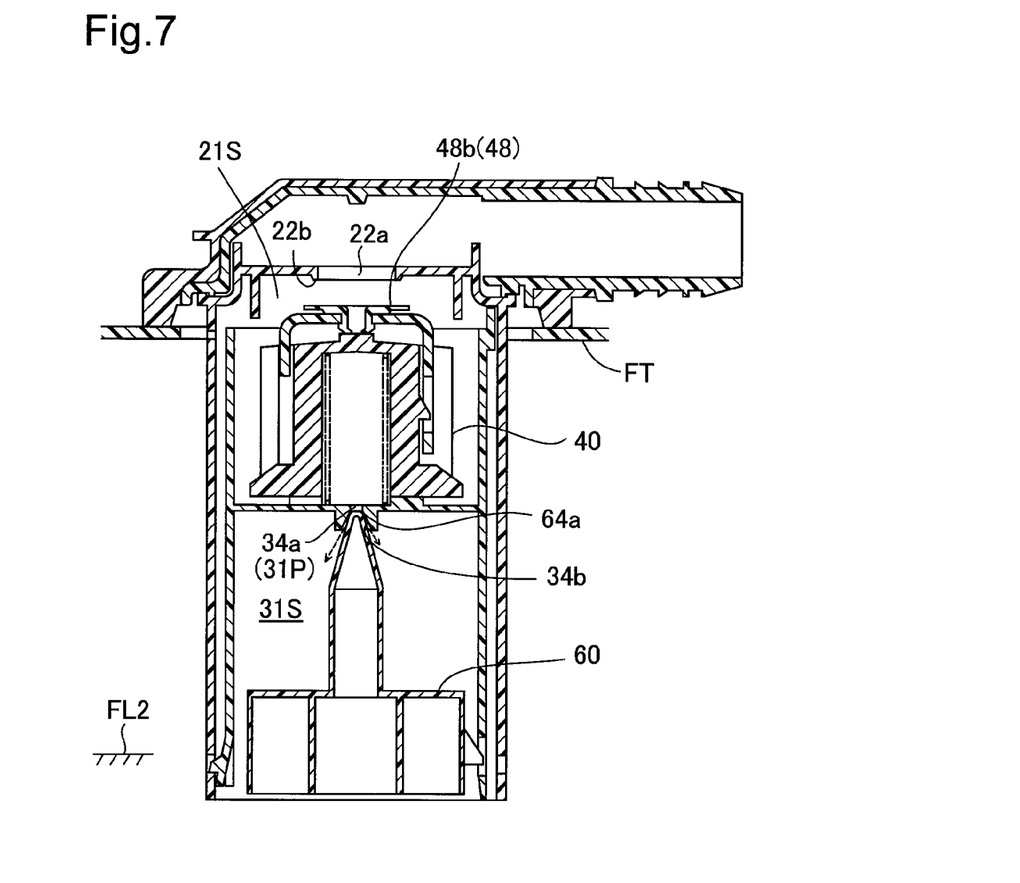
FIG. 7 shows the operation subsequent to FIG. 6.

As shown in FIG. 6, in a state with the seat portion 64a of the secondary valve mechanism 60 seated on the lower seal part 34b and the secondary connection conduit 34a closed, the seat portion 64a and the lower seal part 34b do not have high sealing properties, so the liquid fuel inside the primary valve chamber 21S passes through the gap between the seat portion 64a and the lower seal part 34b and is gradually exhausted to the secondary valve chamber 31S. By exhausting of the liquid fuel inside the primary valve chamber 21S, the fuel level inside the primary valve chamber 21S decreases. Here, the exhaust volume of the liquid fuel is set to a value for which it takes several tens of seconds until the primary valve mechanism 40 falls. Then, as shown in FIG. 7, by the fuel level inside the primary valve chamber 21S going below the predetermined fuel level h1 and the primary valve mechanism 40 falling, the connection conduit 22a is opened, and the inside of the fuel tank FT is opened to the canister side. By the secondary valve mechanism 60 falling when the fuel is consumed and goes below the second fuel level FL2, the fuel cutoff valve 10 returns to its original state.

(3)-2 The fuel cutoff valve 10 functions as a rollover valve as described hereafter. Specifically, as shown in FIG. 1, with the primary valve mechanism 40 in an open valve state, the fuel tank FT has ventilation with the outside ensured through the vents 23b, the primary valve chamber 21S, the tube passage 37a and the like. Also, when a vehicle tilts drastically due to rolling and yawing as described in FIG. 4, By the preliminary valve mechanism 40 operating to the valve closing state, the fuel cutoff valve 10 prevents fuel from flowing out to the outside. Also, when the vehicle is stopped in a state with the vehicle tilted, and the fuel level near the fuel cutoff valve 10 gradually rises, the siphon effect does not occur, and fuel gradually flows into the primary valve chamber 21S through the first communication path 21P and the second communication path 31P, the primary valve mechanism 40 operates to the closing state, and prevents fuel from flowing out to the outside.

(4) Operation and Effect of the Embodiment

The following operations and effects are exhibited with the constitution of the embodiment noted above.

(4)-1 As shown in FIG. 4, during fueling, when the fuel level reaches the first fuel level FL1, and the fuel blocks the connection holes 23c, a large differential pressure occurs between the tank internal pressure and the pressure of the primary valve chamber 21S, fuel enters the primary valve chamber 21S through the first communication path 21P, and the primary valve mechanism 40 rises and closes the connection conduit 22a. Rising of the tank internal pressure makes it possible to have the auto stop operate during fueling. After the auto stop operates once, as shown in FIG. 5, the fuel of the primary valve chamber 21S is exhausted through the secondary connection conduit 34a (second communication path 31P), and the primary valve mechanism 40 falls and opens the connection conduit 22a. The tank internal pressure decreasing allows additional fueling. However, as shown in FIG. 6, when the fuel level reaches the second fuel level FL2 by the additional fueling, the secondary float 61 blocks the secondary connection conduit 34a by its rising. At this time, since the differential pressure between the tank internal pressure and the pressure of the primary valve chamber 31S again becomes larger, the fuel flows into the primary valve chamber 21S through the first communication path 21P. Since the rising of the fuel level inside the primary valve chamber 21S performs the valve closing operation of the primary valve mechanism 40, the connection conduit 22a closed by the primary valve mechanism 40 prevents overfilling. Specifically, the fuel cutoff valve 10 allows additional fuelling with a predetermined volume after the fuel level reaches the first fuel level FL1 (full tank fuel level) and the auto stop operates, preventing overfilling such as the fuel blowing back occurs.

(4)-2 Since the secondary valve mechanism 60 does not have high sealing properties, in a state with the secondary float 61 closing the secondary connection conduit 34a and in a valve closed state when the tank is full, the fuel inside the primary valve chamber 21S gradually leaks through the secondary connection conduit 34a, and the fuel level of the primary valve chamber 21S decreases. However, since the leak volume is a tiny volume, and the fuel level inside the primary valve chamber 21S does not decrease suddenly, and the tank internal pressure is maintained with the primary valve mechanism 40 keeping the connection conduit 22a closed, the fuel cutoff valve 10 prevents the fuel filled by the fuel gun from overfilling with high reliably.

(4)-3 As shown in FIG. 7, after overfilling has been prevented, even in a state with the secondary float 61 closed, the fuel inside the primary valve chamber 21S is gradually exhausted through the secondary connection conduit 34a, and the primary valve mechanism 40 opens the connection conduit 22a. Thus, even when a full tank reaches full tank fuel level after fueling, the fuel tank can ensure ventilation to the outside through the vents 23b, the primary valve chamber 21S, the connection conduit 22a, and the tube passage 37a.

(4)-4 As shown in FIG. 3, since the groove 34c of the seat 34 is formed in radial direction at the center of the secondary connection conduit 34a, so as shown in FIG. 5, even when the fuel inside the primary valve chamber 21S is lower than the height of the seat 34, the fuel inside the primary valve chamber 21S can be quickly exhausted from the groove 34c through the secondary connection conduit 34a.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel cutoff valve that opens and closes a connection conduit connecting a fuel tank and the outside, the fuel cutoff valve comprising:
    a casing that includes a primary valve chamber connected to the connection conduit, and a secondary valve chamber disposed under the primary valve chamber;
    a primary valve mechanism that is housed in the primary valve chamber, that rises and falls according to a fuel level in the primary valve chamber, and that is configured to rise when the fuel level inside the primary valve chamber reaches a first predetermined level; and
    a secondary valve mechanism that is housed in the secondary valve chamber and rises and falls according to a fuel level in the secondary valve chamber, wherein the casing includes a first communication path connecting the fuel tank and the primary valve chamber, and a second communication path connecting the primary valve chamber and the secondary valve chamber, wherein the first communication path is an elongated tube, the casing and the primary valve mechanism are configured such that the primary valve mechanism closes the connection conduit by the fuel in the fuel tank entering the primary valve chamber through the first communication path due to a differential pressure between an internal pressure of the tank and a pressure of the primary valve chamber when the fuel level in the fuel tank reaches a first fuel level, and the casing and the secondary valve mechanism are configured such that the secondary valve mechanism closes the second communication path when the fuel level in the fuel tank reaches a second fuel level as same as the first fuel level or higher than the first fuel level.

2. The fuel cutoff valve in accordance with claim 1, wherein the second communication path is configured such that the fuel in the primary valve chamber flows out with a first flow volume and a second flow volume that is not greater than the first volume, wherein the first flow volume is a flow volume in a state when the secondary valve mechanism opens the second communication path, and the second volume is a volume in a state when the secondary valve mechanism closes the second communication path.

3. The fuel cutoff valve in accordance with claim 2, wherein the casing and the primary valve mechanism are configured such that when the fuel level of the fuel tank exceeds the second fuel level, and the secondary valve mechanism closes the second communication path, the fuel in the fuel tank flows into the primary valve chamber through the first communication path due to the differential pressure between the internal pressure of the tank and the pressure of the primary valve chamber, and the primary valve mechanism closes the connection conduit.

4. The fuel cutoff valve in accordance with claim 3, wherein the casing includes a cylindrical shaped outer casing, and an inner casing that is housed in the outer casing, and the first communication path is formed in a space between the outer casing and the inner casing.

5. The fuel cutoff valve in accordance with claim 1, wherein the casing and the primary valve mechanism are configured such that when the fuel level of the fuel tank exceeds the second fuel level, and the secondary valve mechanism closes the second communication path, the fuel in the fuel tank flows into the primary valve chamber through the first communication path due to the differential pressure between the internal pressure of the tank and the pressure of the primary valve chamber, and the primary valve mechanism closes the connection conduit.

6. The fuel cutoff valve in accordance with claim 1, wherein the casing includes a cylindrical shaped outer casing, and an inner casing that is housed in the outer casing, and the first communication path is formed in a space between the outer casing and the inner casing.

7. The fuel cutoff valve in accordance with claim 6, wherein the inner casing includes a cylinder shaped side wall with a guide hole, and the secondary valve mechanism includes a secondary float with a cylinder shaped side wall, wherein the cylinder shaped side wall has a guide projection that penetrates the guide hole and guides the rise and fall in the vertical direction of the secondary float.

8. The fuel cutoff valve in accordance with claim 6, wherein the inner casing includes a cylinder shaped side wall with a positioning part projection, wherein the positioning part projections is configured to project from the top edge of the side wall, so as to contact to an inner wall of the outer casing, thereby positioning the inner casing to the outer casing in an axis direction of the outer casing.

9. The fuel cutoff valve in accordance with claim 6, wherein the outer casing includes a cylinder shaped side wall with a connection hole, and the inner casing includes a cylinder shaped side wall with a positioning part, wherein the positioning part has a cantilever elastic piece and an engaging protrusion provided projecting from the elastic piece, the engaging protrusion being configured to engage with the connection hole, thereby the inner casing being attached to the outer casing.

10. The fuel cutoff valve in accordance with claim 6, wherein the first communication path further includes a communication-path-connection hole between the first communication path and the fuel tank, and the first communication path is configured to siphon fuel into the primary valve chamber when the fuel level in the fuel tank reaches the first fuel level and blocks the communication-path-connection hole.

11. The fuel cutoff valve in accordance with claim 1, wherein the casing further includes a secondary connection conduit that connects the primary valve chamber and the secondary valve chamber, and that is positioned above the secondary valve mechanism, and the secondary valve mechanism is configured to close the secondary connection conduit after the connection conduit is closed.

12. The fuel cutoff valve in accordance with claim 1, wherein the first communication path vertically extends from a lower end of the secondary valve chamber to an upper end of the primary valve chamber.

13. The fuel cutoff valve in accordance with claim 1, wherein the secondary valve chamber is configured to be partially filled until the fuel level reaches the second fuel level in the fuel tank, the primary valve chamber is configured to be filled after the fuel level reaches the second fuel level in the fuel tank and until the fuel level reaches the first predetermined level in the primary valve chamber, and the secondary valve chamber is configured to be filled further after the primary valve chamber is filled past the first predetermined level.

14. The fuel cutoff valve in accordance with claim 1, wherein the second communication path begins at a lower portion of the secondary valve chamber that is located below a top of the secondary valve mechanism.

15. The fuel cutoff valve in accordance with claim 12, wherein the first communication path vertically extends in a straight line.

* * * * *